United States Patent
Jalan et al.

(10) Patent No.: US 10,038,693 B2
(45) Date of Patent: Jul. 31, 2018

(54) FACILITATING SECURE NETWORK TRAFFIC BY AN APPLICATION DELIVERY CONTROLLER

(71) Applicant: A10 Networks, Inc., San Jose, CA (US)

(72) Inventors: Rajkumar Jalan, Saratoga, CA (US); Gurudeep Kamat, San Jose, CA (US)

(73) Assignee: A10 NETWORKS, INC., San Jose, CA (US)

( * ) Notice: Subject to any disclaimer, the term of this patent is extended or adjusted under 35 U.S.C. 154(b) by 243 days.

(21) Appl. No.: 14/268,914

(22) Filed: May 2, 2014

(65) Prior Publication Data

US 2014/0330982 A1 Nov. 6, 2014

Related U.S. Application Data

(60) Provisional application No. 61/819,417, filed on May 3, 2013.

(51) Int. Cl.
*G06F 15/16* (2006.01)
*H04L 29/06* (2006.01)

(52) U.S. Cl.
CPC ...... *H04L 63/0892* (2013.01); *H04L 63/1458* (2013.01); *H04L 63/1466* (2013.01); *H04L 63/166* (2013.01)

(58) Field of Classification Search
None
See application file for complete search history.

(56) References Cited

U.S. PATENT DOCUMENTS

| | | |
|---|---|---|
| 4,403,286 A | 9/1983 | Fry et al. |
| 4,495,570 A | 1/1985 | Kitajima et al. |
| 4,577,272 A | 3/1986 | Ballew et al. |
| 4,720,850 A | 1/1988 | Oberlander et al. |
| 4,864,492 A | 9/1989 | Blakely-Fogel et al. |
| 4,882,699 A | 11/1989 | Evensen |
| 5,031,089 A | 7/1991 | Liu et al. |
| 5,218,602 A | 6/1993 | Grant et al. |

(Continued)

FOREIGN PATENT DOCUMENTS

| | | |
|---|---|---|
| CN | 1372662 A | 10/2002 |
| CN | 1449618 | 10/2003 |

(Continued)

OTHER PUBLICATIONS

Cardellini et al., "Dynamic Load Balancing on Web-server Systems", IEEE Internet Computing, vol. 3, No. 3, pp. 28-39, May-Jun. 1999.

(Continued)

*Primary Examiner* — Phyllis A Book
(74) *Attorney, Agent, or Firm* — AMPACC Law Group, LLP; Keith Kline

(57) ABSTRACT

Facilitation of secure network traffic by an application delivery controller is provided herein. In some examples, a method includes: (a) receiving a data packet with information from a client indicating that the client is a trusted source; (b) embedding in the data packet a transmission control protocol (TCP) options header, the TCP options header comprising information including at least a sequence number for a protocol connection; and (c) forwarding the embedded data packet to a server.

20 Claims, 6 Drawing Sheets

(56) References Cited

U.S. PATENT DOCUMENTS

| | | |
|---|---|---|
| 5,218,676 A | 6/1993 | Ben-Ayed et al. |
| 5,293,488 A | 3/1994 | Riley et al. |
| 5,341,477 A | 8/1994 | Pitkin et al. |
| 5,432,908 A | 7/1995 | Heddes et al. |
| 5,537,542 A | 7/1996 | Eilert et al. |
| 5,563,878 A | 10/1996 | Blakeley et al. |
| 5,603,029 A | 2/1997 | Aman et al. |
| 5,675,739 A | 10/1997 | Eilert et al. |
| 5,740,371 A | 4/1998 | Wallis |
| 5,751,971 A | 5/1998 | Dobbins et al. |
| 5,754,752 A | 5/1998 | Sheh et al. |
| 5,774,660 A | 6/1998 | Brendel et al. |
| 5,774,668 A | 6/1998 | Choquier et al. |
| 5,796,936 A | 8/1998 | Watabe et al. |
| 5,812,771 A | 9/1998 | Fee et al. |
| 5,828,847 A | 10/1998 | Gehr et al. |
| 5,835,724 A | 11/1998 | Smith |
| 5,867,636 A | 2/1999 | Walker |
| 5,867,661 A | 2/1999 | Bittinger et al. |
| 5,875,296 A | 2/1999 | Shi et al. |
| 5,917,997 A | 6/1999 | Bell et al. |
| 5,918,017 A | 6/1999 | Attanasio et al. |
| 5,923,854 A | 7/1999 | Bell et al. |
| 5,931,914 A | 8/1999 | Chiu |
| 5,935,207 A | 8/1999 | Logue et al. |
| 5,935,215 A | 8/1999 | Bell et al. |
| 5,941,988 A | 8/1999 | Bhagwat et al. |
| 5,944,794 A | 8/1999 | Okamoto et al. |
| 5,946,686 A | 8/1999 | Schmuck et al. |
| 5,951,650 A | 9/1999 | Bell et al. |
| 5,951,694 A | 9/1999 | Choquier et al. |
| 5,958,053 A | 9/1999 | Denker |
| 5,995,981 A | 11/1999 | Lnikstrom |
| 6,003,069 A | 12/1999 | Cavill |
| 6,006,264 A | 12/1999 | Colby et al. |
| 6,006,269 A | 12/1999 | Phaal |
| 6,031,978 A | 2/2000 | Cotner et al. |
| 6,041,357 A | 3/2000 | Kunzelman et al. |
| 6,047,268 A | 4/2000 | Bartoli et al. |
| 6,076,108 A | 6/2000 | Courts et al. |
| 6,088,728 A | 7/2000 | Bellemore et al. |
| 6,098,093 A | 8/2000 | Bayeh et al. |
| 6,104,717 A | 8/2000 | Coile et al. |
| 6,119,174 A | 9/2000 | Borowsky et al. |
| 6,128,279 A | 10/2000 | O'Neil et al. |
| 6,131,163 A | 10/2000 | Wiegel |
| 6,141,759 A | 10/2000 | Braddy |
| 6,185,598 B1 | 2/2001 | Farber et al. |
| 6,219,706 B1 | 4/2001 | Fan et al. |
| 6,223,205 B1 | 4/2001 | Harchol-Balter et al. |
| 6,223,287 B1 | 4/2001 | Douglas et al. |
| 6,247,057 B1 | 6/2001 | Barrera, III |
| 6,249,820 B1 | 6/2001 | Dobbins et al. |
| 6,252,878 B1 | 6/2001 | Locklear, Jr. et al. |
| 6,259,705 B1 | 7/2001 | Takahashi et al. |
| 6,262,976 B1 | 7/2001 | McNamara |
| 6,286,039 B1 | 9/2001 | Van Horne et al. |
| 6,314,463 B1 | 11/2001 | Abbott et al. |
| 6,317,786 B1 | 11/2001 | Yamane et al. |
| 6,321,338 B1 | 11/2001 | Porras et al. |
| 6,324,177 B1 | 11/2001 | Howes et al. |
| 6,330,560 B1 | 12/2001 | Harrison et al. |
| 6,339,423 B1 | 1/2002 | Sampson et al. |
| 6,353,614 B1 | 3/2002 | Borella et al. |
| 6,363,075 B1 | 3/2002 | Huang et al. |
| 6,363,081 B1 | 3/2002 | Gase |
| 6,374,300 B2 | 4/2002 | Masters |
| 6,374,359 B1 | 4/2002 | Shrader et al. |
| 6,381,632 B1 | 4/2002 | Lowell |
| 6,393,475 B1 | 5/2002 | Leong et al. |
| 6,397,261 B1 | 5/2002 | Eldridge et al. |
| 6,430,622 B1 | 8/2002 | Aiken, Jr. et al. |
| 6,445,704 B1 | 9/2002 | Howes et al. |
| 6,446,225 B1 | 9/2002 | Robsman et al. |
| 6,459,682 B1 | 10/2002 | Ellesson et al. |
| 6,490,682 B2 | 12/2002 | Vanstone et al. |
| 6,496,866 B2 | 12/2002 | Attanasio et al. |
| 6,510,464 B1 | 1/2003 | Grantges, Jr. et al. |
| 6,515,988 B1 | 2/2003 | Eldridge et al. |
| 6,542,926 B2 | 4/2003 | Zalewski et al. |
| 6,564,215 B1 | 5/2003 | Hsiao et al. |
| 6,567,857 B1 | 5/2003 | Gupta et al. |
| 6,578,066 B1 | 6/2003 | Logan et al. |
| 6,587,866 B1 | 7/2003 | Modi et al. |
| 6,591,262 B1 | 7/2003 | MacLellan et al. |
| 6,594,268 B1 | 7/2003 | Aukia et al. |
| 6,598,167 B2 | 7/2003 | Devine et al. |
| 6,606,315 B1 | 8/2003 | Albert et al. |
| 6,609,150 B2 | 8/2003 | Lee et al. |
| 6,611,498 B1 | 8/2003 | Baker et al. |
| 6,650,641 B1 | 11/2003 | Albert et al. |
| 6,657,974 B1 | 12/2003 | Britton et al. |
| 6,697,354 B1 | 2/2004 | Borella et al. |
| 6,701,377 B2 | 3/2004 | Burmann et al. |
| 6,704,317 B1 | 3/2004 | Dobson |
| 6,711,618 B1 | 3/2004 | Danner et al. |
| 6,714,979 B1 | 3/2004 | Brandt et al. |
| 6,718,383 B1 | 4/2004 | Hebert |
| 6,742,126 B1 | 5/2004 | Mann et al. |
| 6,745,229 B1 | 6/2004 | Gobin et al. |
| 6,748,413 B1 | 6/2004 | Bournas |
| 6,748,414 B1 | 6/2004 | Bournas |
| 6,760,758 B1 | 7/2004 | Lund et al. |
| 6,763,370 B1 | 7/2004 | Schmeidler et al. |
| 6,763,468 B2 | 7/2004 | Gupta et al. |
| 6,772,333 B1 | 8/2004 | Brendel |
| 6,772,334 B1 | 8/2004 | Glawitsch |
| 6,779,017 B1 | 8/2004 | Lamberton et al. |
| 6,779,033 B1 | 8/2004 | Watson et al. |
| 6,877,095 B1 | 4/2005 | Allen |
| 6,886,044 B1 | 4/2005 | Miles et al. |
| 6,892,307 B1 | 5/2005 | Wood et al. |
| 6,941,384 B1 | 9/2005 | Aiken, Jr. et al. |
| 6,952,728 B1 | 10/2005 | Alles et al. |
| 6,954,784 B2 | 10/2005 | Aiken, Jr. et al. |
| 6,963,917 B1 | 11/2005 | Callis et al. |
| 6,965,930 B1 | 11/2005 | Arrowood et al. |
| 6,996,617 B1 | 2/2006 | Aiken, Jr. et al. |
| 6,996,631 B1 | 2/2006 | Aiken, Jr. et al. |
| 7,010,605 B1 | 3/2006 | Dharmarajan |
| 7,013,482 B1 | 3/2006 | Krumel |
| 7,058,600 B1 | 6/2006 | Combar et al. |
| 7,058,718 B2 | 6/2006 | Fontes et al. |
| 7,058,789 B2 | 6/2006 | Henderson et al. |
| 7,069,438 B2 | 6/2006 | Balabine et al. |
| 7,076,555 B1 | 7/2006 | Orman et al. |
| 7,120,697 B2 | 10/2006 | Aiken, Jr. et al. |
| 7,143,087 B2 | 11/2006 | Fairweather |
| 7,167,927 B2 | 1/2007 | Philbrick et al. |
| 7,181,524 B1 | 2/2007 | Lele |
| 7,188,181 B1 | 3/2007 | Squier et al. |
| 7,218,722 B1 | 5/2007 | Turner et al. |
| 7,225,249 B1 | 5/2007 | Barry et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,611 B2 | 9/2008 | Aiken, Jr. et al. |
| 7,430,755 B1 | 9/2008 | Hughes et al. |
| 7,463,648 B1 | 12/2008 | Eppstein et al. |

(56) References Cited

U.S. PATENT DOCUMENTS

| | | |
|---|---|---|
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,970,934 B1 | 6/2011 | Patel |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,234,650 B1 | 7/2012 | Eppstein et al. |
| 8,239,445 B1 | 8/2012 | Gage et al. |
| 8,255,644 B2 | 8/2012 | Sonnier et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,543,644 B2 | 9/2013 | Gage et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,118,618 B2 | 8/2015 | Davis |
| 9,118,620 B1 | 8/2015 | Davis |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,497,201 B2 | 11/2016 | Chen et al. |
| 9,544,364 B2 | 1/2017 | Jalan et al. |
| 2001/0015812 A1 | 8/2001 | Sugaya |
| 2001/0049741 A1 | 12/2001 | Skene et al. |
| 2002/0010783 A1 | 1/2002 | Primak et al. |
| 2002/0032777 A1 | 3/2002 | Kawata et al. |
| 2002/0078164 A1 | 6/2002 | Reinschmidt |
| 2002/0091831 A1 | 7/2002 | Johnson |
| 2002/0091844 A1 | 7/2002 | Craft et al. |
| 2002/0103916 A1 | 8/2002 | Chen et al. |
| 2002/0124089 A1 | 9/2002 | Aiken, Jr. et al. |
| 2002/0133491 A1 | 9/2002 | Sim et al. |
| 2002/0138618 A1 | 9/2002 | Szabo |
| 2002/0141448 A1 | 10/2002 | Matsunaga |
| 2002/0143953 A1 | 10/2002 | Aiken |
| 2002/0143954 A1 | 10/2002 | Aiken, Jr. |
| 2002/0143991 A1 | 10/2002 | Chow et al. |
| 2002/0166080 A1 | 11/2002 | Attanasio et al. |
| 2002/0178259 A1 | 11/2002 | Doyle et al. |
| 2002/0178265 A1 | 11/2002 | Aiken, Jr. et al. |
| 2002/0178268 A1 | 11/2002 | Aiken, Jr. et al. |
| 2002/0191575 A1* | 12/2002 | Kalavade ............... H04L 63/08 370/338 |
| 2002/0194335 A1 | 12/2002 | Maynard |
| 2002/0194350 A1 | 12/2002 | Lu et al. |
| 2002/0199000 A1 | 12/2002 | Banerjee |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0031180 A1 | 2/2003 | Datta et al. |
| 2003/0035409 A1 | 2/2003 | Wang et al. |
| 2003/0035420 A1 | 2/2003 | Niu |
| 2003/0061402 A1 | 3/2003 | Yadav |
| 2003/0079146 A1 | 4/2003 | Burstein |
| 2003/0081624 A1 | 5/2003 | Aggarwal et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0152078 A1 | 8/2003 | Henderson et al. |
| 2003/0195962 A1 | 10/2003 | Kikuchi et al. |
| 2003/0202536 A1 | 10/2003 | Foster et al. |
| 2004/0001497 A1 | 1/2004 | Sharma |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0253956 A1 | 12/2004 | Collins |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0021949 A1 | 1/2005 | Izawa et al. |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0141506 A1 | 6/2005 | Aiken, Jr. et al. |

(56) References Cited

U.S. PATENT DOCUMENTS

| | | |
|---|---|---|
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1* | 3/2006 | Miyake ............ H04L 63/1458 709/237 |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1* | 9/2006 | Gupta ................ H04L 63/061 370/352 |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1* | 4/2007 | Narayanan ............ H04L 63/08 370/331 |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0274285 A1 | 11/2007 | Werber et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1* | 7/2008 | Maher ................ H04L 63/1458 709/223 |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0320151 A1 | 12/2008 | McCanne et al. |
| 2009/0037361 A1 | 2/2009 | Prathaban et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1* | 10/2009 | Jungck ............ H04L 29/12066 370/392 |
| 2009/0271472 A1 | 10/2009 | Scheifler et al. |
| 2009/0313379 A1* | 12/2009 | Rydnell ............ H04L 63/0407 709/228 |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0188975 A1 | 7/2010 | Raleigh |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0013525 A1 | 1/2011 | Breslau et al. |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0064083 A1 | 3/2011 | Borkenhagen et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0131646 A1* | 6/2011 | Park .................... H04L 63/1458 726/13 |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0155495 A1 | 6/2012 | Clee et al. |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |

(56) References Cited

U.S. PATENT DOCUMENTS

| | | |
|---|---|---|
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0007225 A1 | 1/2013 | Gage et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0089099 A1 | 4/2013 | Pollock et al. |
| 2013/0091273 A1 | 4/2013 | Ly et al. |
| 2013/0100958 A1 | 4/2013 | Jalan et al. |
| 2013/0124713 A1 | 5/2013 | Feinberg et al. |
| 2013/0136139 A1 | 5/2013 | Zheng et al. |
| 2013/0148500 A1 | 6/2013 | Sonoda et al. |
| 2013/0166731 A1 | 6/2013 | Yamanaka et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0191548 A1 | 7/2013 | Boddukuri et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0262702 A1 | 10/2013 | Davis |
| 2013/0282791 A1 | 10/2013 | Kruglick |
| 2013/0311686 A1 | 11/2013 | Fetterman et al. |
| 2014/0012972 A1 | 1/2014 | Han |
| 2014/0047115 A1 | 2/2014 | Lipscomb et al. |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1* | 9/2014 | Li .................. H04L 67/02 709/219 |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330977 A1* | 11/2014 | van Bemmel ........ H04L 69/22 709/226 |
| 2014/0334485 A1 | 11/2014 | Jain et al. |
| 2014/0359052 A1 | 12/2014 | Joachimpillai et al. |
| 2015/0039671 A1 | 2/2015 | Jalan et al. |
| 2015/0085650 A1 | 3/2015 | Cui et al. |
| 2015/0156223 A1 | 6/2015 | Xu et al. |
| 2015/0215436 A1* | 7/2015 | Kancherla .......... H04L 63/1458 709/219 |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2015/0350383 A1 | 12/2015 | Davis |
| 2015/0381465 A1 | 12/2015 | Narayanan et al. |
| 2016/0014052 A1 | 1/2016 | Han |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |
| 2016/0261642 A1 | 9/2016 | Chen et al. |
| 2017/0041350 A1 | 2/2017 | Chen et al. |

FOREIGN PATENT DOCUMENTS

| | | |
|---|---|---|
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 101495993 A | 7/2009 |
| CN | 101567818 A | 10/2009 |
| CN | 101878663 A | 11/2010 |
| CN | 102104548 A | 6/2011 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103365654 A | 10/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| EP | 0648038 A2 | 4/1995 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1188498 A | 5/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A1 | 8/2015 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014-143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| JP | 5946189 B2 | 6/2016 |

(56) References Cited

FOREIGN PATENT DOCUMENTS

| | | |
|---|---|---|
| KR | 10-0830413 | 5/2008 |
| KR | 1020120117461 | 8/2013 |
| KR | 101576585 B1 | 12/2015 |
| WO | 01/13228 | 2/2001 |
| WO | WO2001014990 | 3/2001 |
| WO | WO2001045349 | 6/2001 |
| WO | WO2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2011049770 | 4/2011 |
| WO | WO2011079381 A1 | 7/2011 |
| WO | 2011149796 | 12/2011 |
| WO | 2012050747 | 4/2012 |
| WO | 2012075237 | 6/2012 |
| WO | WO2012083264 A2 | 6/2012 |
| WO | WO2012097015 A2 | 7/2012 |
| WO | 2013070391 | 5/2013 |
| WO | 2013081952 | 6/2013 |
| WO | 2013096019 | 6/2013 |
| WO | 2013112492 | 8/2013 |
| WO | WO2014031046 A1 | 2/2014 |
| WO | WO2014052099 | 4/2014 |
| WO | 2014088741 | 6/2014 |
| WO | 2014093829 | 6/2014 |
| WO | 2014138483 | 9/2014 |
| WO | 2014144837 | 9/2014 |
| WO | WO 2014179753 | 11/2014 |
| WO | WO2013070391 | 9/2015 |
| WO | WO2015153020 A1 | 10/2015 |

OTHER PUBLICATIONS

Goldszmidt et al. NetDispatcher: A TCP Connection Router, IBM Research Report RC 20853, May 19, 1997.
Noguchi, "Realizing the Highest Level "Layer 7" Switch" = Totally Managing Network Resources, Applications, and Users =, Computer & Network LAN, Jan. 1, 2000, vol. 18, No. 1, p. 109-112.
Takahashi, "The Fundamentals of the Windows Network: Understanding the Mystery of the Windows Network from the Basics", Network Magazine, Jul. 1, 2006, vol. 11, No. 7, p. 32-35.
Ohnuma, "AppSwitch: 7th Layer Switch Provided with Full Setup and Report Tools", Interop Magazine, Jun. 1, 2000, vol. 10, No. 6, p. 148-150.
Koike et al., "Transport Middleware for Network-Based Control," IEICE Technical Report, Jun. 22, 2000, vol. 100, No. 53, pp. 13-18.
Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.
Abe et al., "Adaptive Split Connection Schemes in Advanced Relay Nodes," IEICE Technical Report, Feb. 22, 2010, vol. 109, No. 438, pp. 25-30.
Spatscheck et al., "Optimizing TCP Forwarder Performance", IEEE/ACM Transactions on Networking, vol. 8, No. 2, Apr. 2000.
Kjaer et al. "Resource allocation and disturbance rejection in web servers using SLAs and virtualized servers", IEEE Transactions on Network and Service Management, IEEE, US, vol. 6, No. 4, Dec. 1, 2009.
Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.
Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.
"TCP—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

Cardellini, et al., "Dynamic Load Balancing on Web-Server Systems", IEEE Internet Computing, 1999, vol. 3(3), pp. 28-29.
Samar, V., "Single Sign-On Using Cookies for Web Applications," IEEE 8th International Workshop, 1999, pp. 158-163.
"Allot Announces the General Availability of its Directory Services-Based NetPolicy™ Manager," Allot Communications, Tel Aviv, Israel, Feb. 28, 2000, 2 pages.
"Allot Communications Announces Business-Aware Network Policy Manager," Allot Communications, Sophia Antipolis, France, Sep. 20, 1999, 2 pages.
"Allot Communications Announces Directory Services Based Network Policy Manager," Allot Communications, Los Gatos, California, Apr. 5, 1999, 2 pages.
"Allot Communications Announces the Netenforcer Family of IP Traffic Management Products: Fault-Tolerant, Scaleable, Policy-Based Bandwidth Management, QOS, SLA Solutions," Allot Communications, Burlingame, California, Dec. 13, 1999, 2 pages.
"Allot Communications Launches NetEnforcer with NetWizard, the Fastest Way to Implement Accurate and Reliable Network QoS Policies," Allot Communications, Burlingame, California, Jan. 25, 2001, 2 pages.
"Allot Introduces Turnkey Next Generation IP Service and Creation Solution—the Virtual Bandwidth Manager," Allot Communications, Atlanta, Georgia, SUPERCOMM 2000, Booth #8458, Jun. 5, 2000, 2 pages.
"Data Communications Awards Allot Communications 'Hot Product' in Internetworking/IP Tools Category," Allot communications, Los Gatos, California, Jan. 18, 1999, 2 pages.
"Policy-Based Network Architecture," Allot Communications, 2001, 12 pages.
Dahlin, A. et al, "EDDIE A Robust and Scalable Internet Server," Ericsson Telecom AB, Stockholm, Sweden, pp. 1-7 (May 1998).
Aron, Mohit et al., "Efficient Support for P-HTTP in Cluster-Based Web Servers," Proceedings of 1999 Annual Usenix Technical Conference, Monterey, California, Jun. 1999, 14 pages.
Aron, Mohit et al., "Scalable Content-aware Request Distribution in Cluster-based Network Servers," Proceedings of the 2000 Annual Usenix Technical Conference, San Diego, California, Jun. 2000, 15 pages.
Aron, Mohit, "Scalable Content-aware Request Distribution in Cluster-based Network Servers," Department of Computer Science, Rice University [Online, retreived on Mar. 13, 2001], Retreived from the Internet: <URL:http://softlib.rice.edu/softlib/scalableRD.html>, 8 pages.
"ACEdirector™: 8-PORT 10/100 MBPS Ethernet Switch," Alteon WebSystems, San Jose, California (1999), 2 pages.
"Enhancing Web User Experience with Global Server Load Balancing," Alteon WebSystems, San Jose, California, Jun. 1999, 8 pages.
"The Next Step in Server Load Balancing," Alteon WebSystems, San Jose, California, Nov. 1999, 16 pages.
"1.3.1.2.5 Virtual IP Addressing (VIPA)," excerpt from "IP Configuration" [online], IBM Corporation, 1998 [retreived on Sep. 8, 1999], retreived from the Internet: <URL:http://w3.enterlib.ibm.com:80/cgi-bin/bookmgr/books/F1AF7001/1.3.1.2>, 4 pages.
"1.3.20 Device and Link Statement-Virtual Devices (VIPA)," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 3 pages.
"1.3.23 Home Statement," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 6 pages.
Devine, Mac, "TCP/IP Application Availability and Workload Balancing in the Parallel Sysplex," Share Technical Conference, Aug. 22-27, 1999, 17 pages.
Pai, Vivek S. et al., "Locality-Aware Request Distribution in Cluster-based Network Servers," Proceedings of the 8th International Conference on Architectural Support for Programming Languages and Operating Systems (ASPLOS VIII), San Jose, CA, Oct. 1998, 12 pages.

(56) References Cited

OTHER PUBLICATIONS

Apostolopoulos, G. et al., "Design, Implementation and Performance of a Content-Based Switch," INFOCOM 2000, Nineteenth Annual Joint Conference of the IEEE Computer and Communication Societies, IEEE, Mar. 2000, pp. 1117-1126, vol. 3.

* cited by examiner

FACILITATING SECURE NETWORK TRAFFIC BY AN APPLICATION DELIVERY CONTROLLER

CROSS-REFERENCE TO RELATED APPLICATIONS

The present application claims the priority benefit of U.S. Provisional Application Ser. No. 61/819,417, filed May 3, 2013, titled "Facilitating Secure Network Traffic by an Application Delivery Controller". This application is also related to co-pending U.S. Nonprovisional patent application Ser. No. 14/261,322, filed Apr. 24, 2014 and titled "Systems and Methods for Network Access Control," and to co-pending U.S. patent application Ser. No. 13/791,760 titled "Application Delivery Controller and Global Server Load Balancer" filed on Mar. 8, 2013. All of the disclosures of the above applications are hereby incorporated by reference in their entireties, including all references cited therein.

FIELD OF THE INVENTION

The present disclosure relates generally to data processing, and more specifically to mechanisms that may be employed by an Application Delivery Controller (ADC) to prevent a denial of service attack in various network configurations.

SUMMARY

According to some embodiments, the present technology is directed to a method for facilitating a secure network by a network device. The method may include: (a) receiving a data packet with information from a client indicating that the client is a trusted source; (b) embedding in the data packet a transmission control protocol (TCP) options header, the TCP options header comprising information including at least a sequence number for a protocol connection; and (c) forwarding the embedded data packet to a server.

According to other embodiments, the present technology is directed to a method for facilitating a secure network by a network device. The method may include: (a) receiving, at the network device, a data packet with information from a client indicating that the client is a trusted source; (b) modifying an Internet protocol (IP) header of the data packet with an encoded value from an index table; and (c) forwarding the data packet with the modified IP header to a server.

According to some embodiments, the present technology is directed to a method that comprises: (a) receiving a data packet with information from a client indicating that the client is a trusted source; (b) communicating, in a first channel established between the network device and a server, connection parameters included in a SYN packet received from the client, the connection parameters comprising parameters necessary for efficient data transfer over the secure network; and (c) forwarding, in a second channel established between the network device and the server, data packets of a data flow from the client.

According to other embodiments, the present technology is directed to an application delivery controller comprising: (a) a processor; and (b) a memory for storing executable instructions, the processor being configured to execute the instructions to: (i) receive a data packet with information from a client indicating that the client is a trusted source; (ii) perform either: (1) an embedding of transmission control protocol (TCP) options header in the data packet, the TCP options header comprising parameters for a protocol connection or (2) a modification of an Internet protocol (IP) header of the data packet with an encoded value from an index table; and (iii) forward the embedded or modified data packet to a server.

BRIEF DESCRIPTION OF THE DRAWINGS

Embodiments are illustrated by way of example, and not limitation, in the figures of the accompanying drawings, in which like references indicate similar elements.

DETAILED DESCRIPTION

Figure 1:
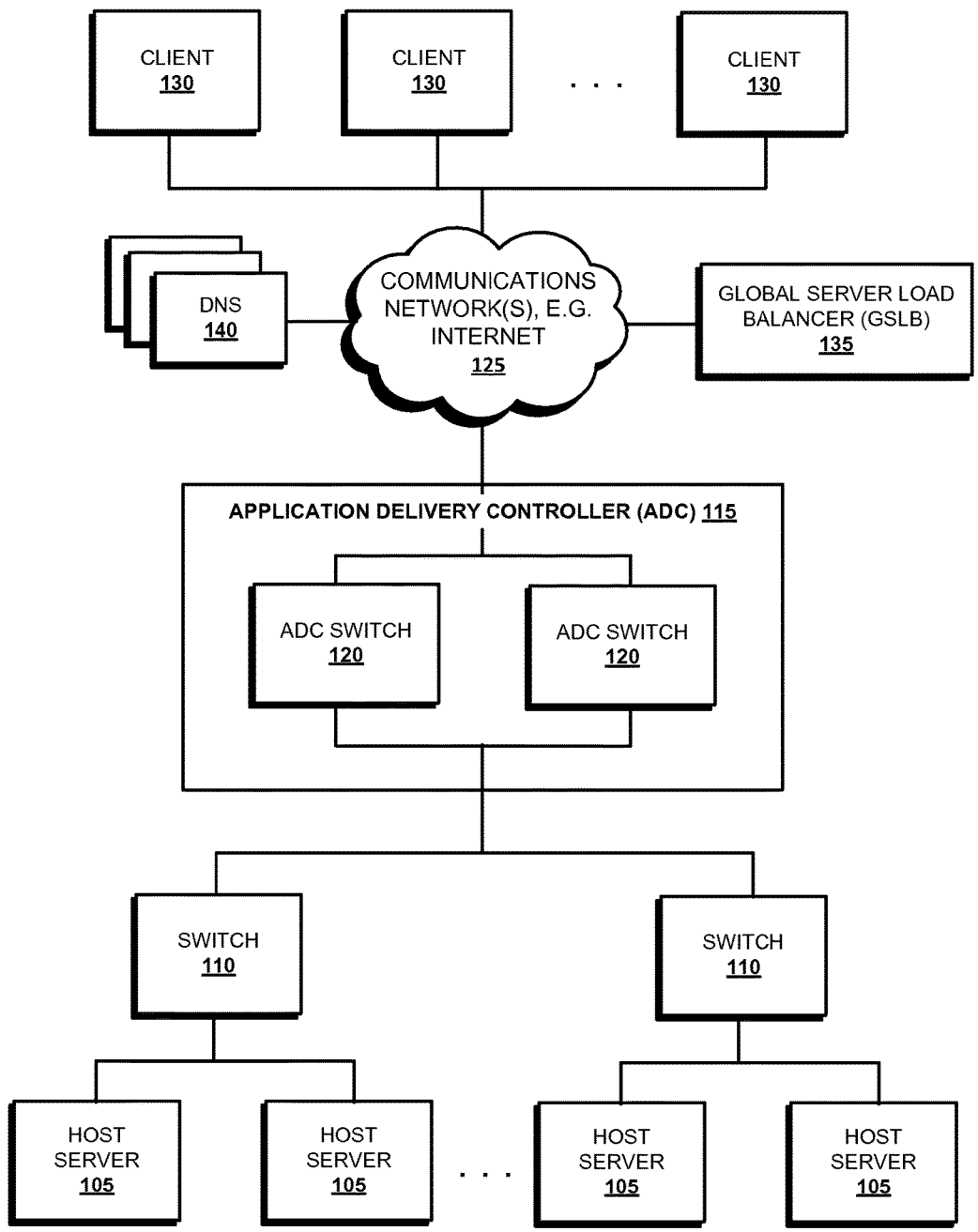
FIG. 1 is a block diagram of an exemplary symmetric network suitable for implementing one or more methods of the present disclosure.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present disclosure relates generally to data processing, more specifically to mechanisms that may be employed by an Application Delivery Controller (ADC) to prevent a denial of service attack in various network configurations.

Websites, web and mobile applications, cloud computing, and various web and mobile services have been rising in popularity. Some examples of fast growing consumer services include smart phone applications, location based services, navigation services, e-book services, video applications, music applications, Internet television services, and so forth. Subsequently, more and more servers are deployed within data networks including the Internet to accommodate the increasing computing and data storage needs. These servers are typically arranged in data centers or web farms, which may include ADCs, GSLB and/or server load balancers (SLBs).

In TCP/IP networks, one method of establishing a connection between two network devices such as a client device and a server, is through the use of a SYN packet, also sometimes referred to as a SYN flag. In this scenario, the client device that wishes to establish the connection first sends a SYN packet to the server. The SYN packet may comprise information within it such as the source IP address, source port, destination IP address, destination port, timestamp, maximum segment size, window scale, a sequence number for the connection, and other types of information.

Once the server receives the SYN packet, it typically responds with a SYN/ACK (or SYN acknowledgement) to acknowledge receipt of the SYN packet and the request to establish a connection. Upon receipt of the SYN/ACK, the client device typically responds with an acknowledgement ACK packet (the authentication acknowledgement), and the network connection is established, such that the two devices can now send data back and forth over the network. Typically, before the connection has actually been established, the server creates a session entry when it receives the SYN packet and keeps track of the information in the client's SYN packet for the connection (source and destination ports, source and destination IP addresses, timestamp, window scale, sequence number, and so forth).

However, this type of connection is vulnerable to a SYN attack. In a typical SYN attack, the server gets overwhelmed by SYN packets coming in at a faster rate than it can process them. This may lead to a denial of service response by the server, because the server is overwhelmed by the sheer number of SYN packets it receives. Because the server doesn't have enough resources to respond to all of the requests, the server may become unable to respond to any of the requests.

To help protect against these types of attacks, a server may utilize a SYN-cookie. When the server receives a SYN packet from a client device, it may generate a SYN-cookie that contains values based on the information in the original SYN packet. If the client device is a legitimate device and not a botnet, it will return to the server an ACK data packet, or authentication acknowledgement data packet, which contains the information from the SYN-cookie. The server then validates the sequence number and/or other information with the SYN-cookie and re-computes the original values from the SYN packet such as the client device's sequence number, window size, timestamp, maximum segment size, and so forth. The server does not create a session entry for the connection until it receives the ACK packet, thus preventing a botnet from overwhelming a server and taking it down by sending SYN packets.

Conventionally, an ADC is a network device disposed in a datacenter and part of an application delivery network (ADN). The ADC may allow performing common tasks, normally done by web servers, in an effort to remove some load from the web servers. ADCs are typically placed between the firewall/router and the host (web) servers. In addition, conventional ADCs may include various features providing for compression, caching, connection multiplexing, application layer security, and content switching. These features may be combined with basic server load balancing, content manipulation, advanced routing strategies, and highly configurable server health monitoring.

Additionally, ADCs may manage load balancing and delivery of service sessions from client host computers to servers based at least in part on incoming service requests. As more servers are deployed, additional ADCs may be deployed. Similarly, as more servers are pooled together within the data center or spread across multiple data centers to provide scalability, ADCs may become bottlenecks slowing data transmissions between peers on the network.

Because the ADC network device is typically placed between the firewall/router and the host (web) server, it may also be utilized for screening to ensure that the client host computer requesting to connect with the server is from a trusted source. However, routing all network traffic to and from the host servers through the ADCs may cause the ADCs to become a bottleneck. To prevent this from happening and to ease some of the burden on the ADCs, an "asymmetric" network, also referred to as "direct server return" configuration may be deployed. In this configuration, the client device's request for services may be forwarded to the server once the server device has been selected, but the response from the server may be sent directly to the client instead of being routed back through an ADC.

Deploying an ADC in such a TCP/IP network means that three devices must now communicate with each other. In order to send and receive data, the client device, ADC, and server need to maintain the sequence numbers for the connection. In a symmetric network configuration, the ADC can function as the intermediary between the client device and server; it can establish a two-way connection between itself and the client, and also another two-way connection between itself and the server. In this way, the ADC can facilitate the transfer of data back and forth between the client device and server. However, in an asymmetric network configuration, the ADC does not receive the traffic back from the server, and thus cannot serve as the intermediary. Therefore, the ADC needs to pass along the parameters from the client's SYN packet to the server, such that when the server sends back response data, it maintains the same characteristics contained in the original SYN and SYN/ACK packets including, but not limited to, sequence numbers, maximum segment size, window scale, timestamp, etc.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices like FPGA's, or various combinations thereof. In particular, the methods described herein may be implemented by a series of computer-executable instructions residing on a storage medium such as a disk drive, or computer-readable medium. It should be noted that methods disclosed herein can be implemented by a computer, e.g., a desktop computer, server, tablet computer, laptop computer, smartphone and so forth.

The present technology provides various methods for operation of ADCs in data networks such as the Internet including a plurality of switches, routers, virtual switches, web farms, host servers, and other units. The present technology provides enhanced performance and security of ADC and allows implementing scalable business solutions for any services, applications, clouds and organizations. Furthermore, the present technology provides a scalable, high-performance application networking platform, which delivers superior reliability, security, and energy efficiency at lower total cost of ownership. ADC can also provide increased infrastructure efficiency, a faster end user experience, comprehensive Layer 4-7 feature set and flexible virtualization technologies such as Virtual Chassis System, multi-tenancy, and more for public, private and hybrid cloud environments. The ADC may include software and/or hardware components/platforms that may vary depending on a particular application, performance, infrastructure, network capacity, data traffic parameters, and so forth. A more detailed explanation of an exemplary method of ADC operation is described in U.S. utility patent application Ser. No. 13/791,760, filed on Mar. 8, 2013, titled "Application Delivery Controller and Global Server Load Balancer" which is hereby incorporated herein by reference in its entirety including all references cited therein.

The present technology further provides various systems and methods for operation of a service on a network. It provides technology to identify viruses, botnets, trojans, malware, and other type of unauthorized services from accessing and overwhelming a host server providing the service. These systems and methods may be used to prevent a denial of service attack on a network device.

Turning now to FIG. 1, a high-level block diagram of a network topology 100 suitable for implementing one or more methods of the present disclosure is shown. The network topology 100 shown by FIG. 1 may include a number of host servers 105, a number of switches 110 combining/coupling the host servers 105 and thus performing Layer 2 aggregation and corresponding switching. The topology 100 may further include an ADC 115 including one (or more) ADC switches 120, which may employ one or more of the methods disclosed herein. As will be appreciated by those skilled in the art, the ADC switches 120 may operate in different modes, such as standalone, active/standby mode, backup mode, active-active and others, depending on an application.

Still referring to FIG. 1, the topology 100 may further include a communications network 125, which may refer to, for example, the Internet, Local Area Network (LAN), Wide Area Network (WAN), Internet, a cellular network, a telephone network, or any other switched network or their combinations. There is also a plurality of clients 130, which may include end user computers, mobile phones, thin clients, and so forth. There are also one or more Local DNS Servers which may be associated with one or more clients 130 and/or one or more host servers 105. As shown in FIG. 1, the topology may include a GSLB 135, which may also employ one or more of the methods disclosed herein.

Generally speaking, load balancing is a technique that may be used for distributing the workload evenly across clients 130, networks 125, host servers 105, and other networked resources. The load balancing may enhance utilization of resources and enable maximize throughput with minimum response time, hence avoiding overloading of a single server.

A typical data packet in a TCP/IP network, may be comprised of a data component and one or more header components. The header may comprise a layer 2 header, layer 3 header, layer 4 header, or any other necessary components for transmitting the packet. The layer 2 header may comprise information such as a destination MAC address, source MAC address, and Ethernet type. The layer 3 header may be an IP header, and the layer 4 header may be a TCP header.

The IP header may comprise identifying information such as the source IP address from which the packet originated, the destination IP address for the packet, and other IP options. The IP options in the IP header may comprise information that describes the packet, directs the packet to take a particular route to reach the destination, information regarding policies for the packet, experimental fields, and any other attribute. The IP options may be defined by a type-length-value system whereby the first two bytes represent the option identification number, the next two bytes represent the length, and the remaining bytes represent the value (encoded information about the option itself).

The TCP header may comprise identifying information such as the source port from which the packet originated, the destination port for the packet, window, sequence number, ACK number, any flags (such as SYN flags), and other TCP options. Some examples of TCP options may include maximum segment size (MSS), window scale, selective ACK, timestamp, and other experimental options. The window scale may comprise a factor by which to multiply the window. Typically the window scale may be any factor up to 15. Selective ACK messages may be used for selective retransmission of individual data packets that were not received at the destination. Timestamp may also be used to identify that the data being sent is from the same device by aligning the numerical values of the timestamp.

In certain embodiments, the ADC 115 may employ a SYN packet technique utilizing a SYN-cookie to verify that the client 130 is a trusted source and not a spoof, botnet, or any other unauthorized program. In an exemplary methodology, the client 130 may first send a SYN packet to the ADC 115, which may include a sequence number for communicating on a TCP/IP stack. The ADC 115 may then send a SYN/ACK to the client 130, comprising a SYN-cookie. The SYN-cookie may comprise a sequence number for the ADC 115, as well as an acknowledgement of the client's sequence number. The client may then respond with an acknowledgement of the SYN-cookie, thus authenticating that the client's IP address has not been spoofed. Once the client 130 has been authenticated, the ADC 115 may then forward data from the client to the host server 105.

In a stateless operating mode, the ADC 115 does not retain any information about the SYN packet until the final acknowledgement is received and the connection is established. This is to prevent a denial of service attack causing the ADC 115 to be overwhelmed with a flood of SYN packets. Furthermore, TCP options from the client 130 to the ADC 115 are typically exchanged in the first SYN packet, and the SYN/ACK, but are not exchanged again after the connection is established. Thus, the ADC 115 may encode the data from the TCP options received in the original SYN packet into the SYN-cookie that it sends with the SYN/ACK. A SYN-cookie typically contains four bytes of data, and thus TCP options such as MSS, window scale, and selective ACK may be encoded within those data bytes. When the client 130 receives the SYN/ACK with the SYN-cookie within it, the client 130 then transmits an acknowledgement back to the ADC 115 with a sequence number referring to the SYN-cookie. Thus, even though the ADC 115 does not retain the actual TCP options received in the original SYN packet while operating in a stateless mode, it may still have the relevant information necessary in the encoded SYN-cookie sequence numbers to re-compute those parameters to communicate with the host servers 105.

Since the ADC 115 is connected to a plurality of servers 105 at any given time, the ADC 115 may periodically probe the servers through a health check or any other methodology to determine which server to route the requests to. In one embodiment, the ADC 115 may probe the active servers 105 and calculate a lowest common denominator to present to the client 130. For example, if the ADC 115 probes three servers about their window scale capacity, and the servers have capacity for a window scale of five, seven, and ten, the ADC 115 may present a window scale of five to the client 130. Thus, regardless of which server the traffic is ultimately routed to, all servers will be able to handle at least that much traffic.

In exemplary embodiments, the ADC 115 may also comprise a translation layer. The translation layer may comprise information that is calculated and placed in the packet header to correlate the options in the packet header from the client with the options that the host server 105 has the capacity to serve. This is to maintain the proper protocols for communicating in the TCP/IP stack. When the ADC 115 routes a particular packet from a client 130 to a host server 105, it may adjust the values in the TCP header to match the parameters that the particular host server 105 has the capacity to serve. In this way, the protocols are aligned and communication between the network devices is streamlined. In certain embodiments, the translation layer may comprise a Layer 4 expanded SYN-cookie, Layer 3 SYN-cookie, or any other mechanism for interfacing between the header options of the client 130 and the host server 105.

Figure 2:
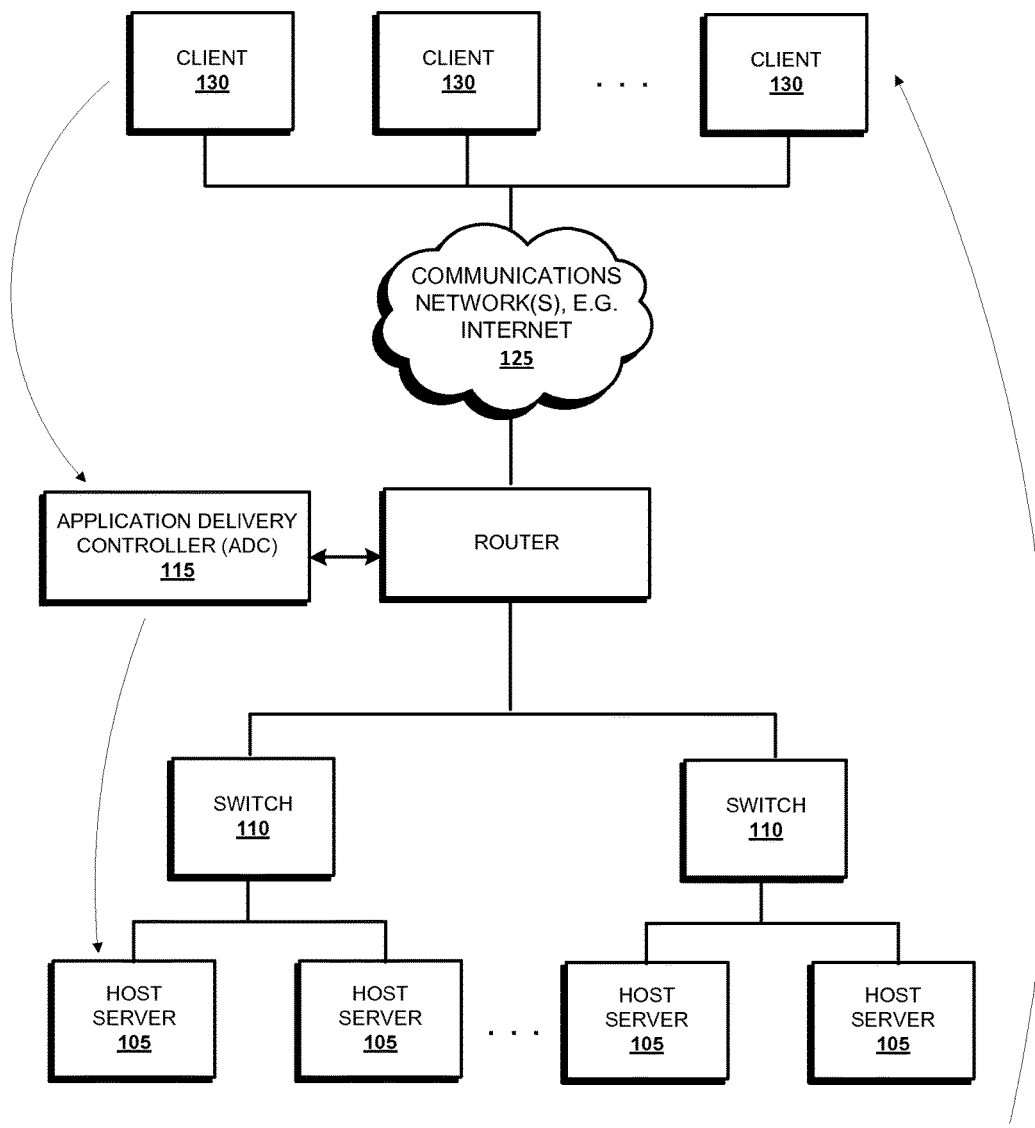
FIG. 2 is a block diagram of an exemplary asymmetric network suitable for implementing one or more methods of the present disclosure.

FIG. 2 illustrates a block diagram of an exemplary network topology 200 operating in an "asymmetric" or "direct server return" mode. In this mode, a client 130 may submit a request for services. The request is transmitted through the communications network 125 to the ADC 115. Once the ADC 115 can verify that the client is a trusted source and the request is legitimate using a SYN-cookie or any other verification method, the ADC 115 may forward the request to one or more host servers 105. The one or more host servers 105 may then return the data to the client 130, such that the ADC 115 does not become a bottleneck in the system 200.

To maintain the TCP connection between the client 130, ADC 115, and host servers 105, a change is needed to the host server's TCP stack. In a typical TCP/IP stack, the ADC 115 would request to connect to the host server 105 by sending it a SYN packet, and then being authenticated via a SYN-cookie, or any other such method. However, in the asymmetric mode, the ADC 115 begins communicating with the host server 105 by forwarding to it the authentication acknowledgement data packet (ACK packet) from the client such that it has all of the header options from the client 130.

Once the client 130 has been authenticated by the ADC 115, the data from the client 130 is transmitted directly to the server 105. However, the sequence numbers, TCP options, and other data in the packet from the client 130 that is forwarded directly to the server 105 contains references to data parameters that the server is not familiar with, since the authentication of the client 130 occurred prior to the data being transmitted to the server 105. Thus, in some embodiments, when the ADC 115 receives the acknowledgement from the client 130 referencing its SYN-cookie, the ADC 115 may then embed or stamp certain data onto the packet before forwarding it on to a server 105. The ADC 115 may embed data such as server sequence number, client MSS, client selective ACK, client window scale, client timestamp, or any other data found in the header, such that the processing information needed for the data packets from the client matches with the processing information needed for the packets from the server 105. In various embodiments, varying amounts of TCP option information may be embedded in the final ACK packet received from the client 130 before it is forwarded to the server 105.

In various embodiments, the ADC 115 may add TCP options to the ACK packet that it forwards to the server 105. The TCP options may include information such as window, MSS, timestamp, and so forth, or combinations thereof. The ADC 115 may accomplish this by adding one (1) TCP option for every parameter needed, or may simply use one TCP option with designated fields for each parameter. For example, the ADC 115 may designate one TCP option field of 64 bit length. The ADC 115 may use the first eight bits to represent the maximum segment size, the next 8 bits to represent the window size, etc.

When the server 105 receives the packet with the modified header information, it may recognize that the data packet and/or client 130 source has previously been authenticated by the ADC 115, and thus the server may automatically deem the data packet to be trusted and place it into the TCP stack for processing. In certain embodiments, the ADC 115 may only embed such information into the header of the initial packet forwarded to the server 105. In other embodiments, the ADC 115 may embed TCP option data into the header of all data packets it forwards to the server 105. In various embodiments, the TCP options and/or other information may be embedded onto the data packet forwarded by the ADC 115 to the server 105 through the use of an SDK that may be deployed by a network administrator for a server.

In other embodiments, the ADC 115 may add IP options to the ACK packet that it forwards from the client 130 to the server 105. The IP header of a data packet may include a fixed header and options fields. In one embodiment, the ADC 115 may use the IP options field(s) of the IP header to encode the relevant information necessary for the server 105 to communicate directly with the client 130, including the sequence numbers, timestamp, etc. The ADC 115 may accomplish this by adding one IP option for every parameter needed, or may simply use one IP option with designated fields for each parameter. For example, the ADC 115 may designate one IP option field of 64 bit length, and use eight bits to represent each of the various parameters.

In another embodiment, the ADC 115 may use the fixed header portion of an IP header. In the fixed header portion of an IP header of a data packet, there is an IP identification field. Typically, the IP identification field is two bytes in length, which allows 16 bits of encoded information. The ADC 115 may create an index table of 2^16 different combinations of parameter values, or some other appropriately sized index table. After the client 130 has been authenticated, the ADC 115 may re-compute the original parameters from the client's original SYN packet, and then pick the most appropriate parameter combination from the options in the index table. Then, the ADC 115 may encode a value associated with that entry in the index table into the IP identification field of the fixed IP header, which is then added to the data packet forwarded to the server 105.

When the server 105 receives this data packet from the ADC 115, it may receive the value from the IP identification field of the fixed IP header on the data packet, look up this value in the index table, and from there extract the proper source information, destination information, sequence numbers, timestamp, and all other relevant parameters necessary for ensuring proper data transfer over the network.

The index table that the ADC 115 uses to encode a value into the IP identification field is the same index table that the servers 105 may use to decode the value. The table may be static, such that the parameters and their associated encoded values are fixed. Alternatively, the table may be dynamic, and the ADC 115 and servers 105 may synchronize their tables periodically. In various embodiments, each network device may maintain its own local copy of the index table that is periodically synchronized. Alternatively, the index table may be maintained in a network database, or any other data structure, that is accessible to any network device from any location in the network.

In another embodiment, the processing information needed by the server 105 may directly be placed by the ADC 115 in a network database, or any other data structure, that is accessible to any network device from multiple locations in the network. In this configuration, the server 105 may look up the processing information directly, without the ADC 115 being required to make modifications to the packets it sends to the servers.

In further embodiments, the ADC 115 may transfer the relevant connection parameters from the client's SYN packet to the servers 105 through an out of band mechanism. In these embodiments, the ADC 115 may utilize one channel to authenticate itself to the servers 105 and transfer information regarding the data flow to the servers such as the sequence numbers, timestamp, window size, and any other relevant parameter necessary for efficient data transfer over the network. The ADC 115 may then utilize a separate channel to forward the actual data packets from the client 130 to the servers 105. In this way, the ADC 115 may not need to alter the ACK packet or any other data packets it receives from the client 130 before forwarding to the server 105 for processing.

In various embodiments, the ADC 115 may utilize the first channel to transmit information about the upcoming data flow to the server 105 at the beginning of each data flow, periodically throughout the data flow, and/or at the end of the data flow.

In other embodiments, the ADC 115 may utilize IP tunneling to transfer the relevant information necessary to the servers 105 about the data. In these embodiments, the ADC 115 may not need to edit the ACK packet received from the client 130 before forwarding it to the server 105. The ADC 115 may instead utilize a module to place the ACK packet in another packet with an IP header that contains the relevant parameters, and then send this modified packet to the servers 105. When the server 105 receives the modified packet, it may extract from the modified packet's IP header the sequence number for the connection, timestamp, and all other relevant parameters necessary for proper data flow between the server 105 and the client 130. In various embodiments, the ADC 115 may utilize a tunnel header to communicate the relevant parameters. The ADC 115 may use a module to encapsulate the ACK packet from the client with data representing the relevant parameters. When the server 105 receives the modified packet, it may use a module to extract the outer header with the relevant parameters such that when it sends response data back to the client 130, it may do so with the proper sequence numbers, timestamp, window, and/or other parameters to communicate over the network protocol.

While the above methods have been described generally with a first packet being received by the server from the ADC as being the ACK packet that includes processing information (that is, information that is needed by the server for communicating with the client), it will be understood by those skilled in the art that the first packet received by the server from the ADC may not be the ACK packet, but could also be another SYN packet or some other packet in which the necessary processing information is embedded or otherwise communicated.

Figure 3:
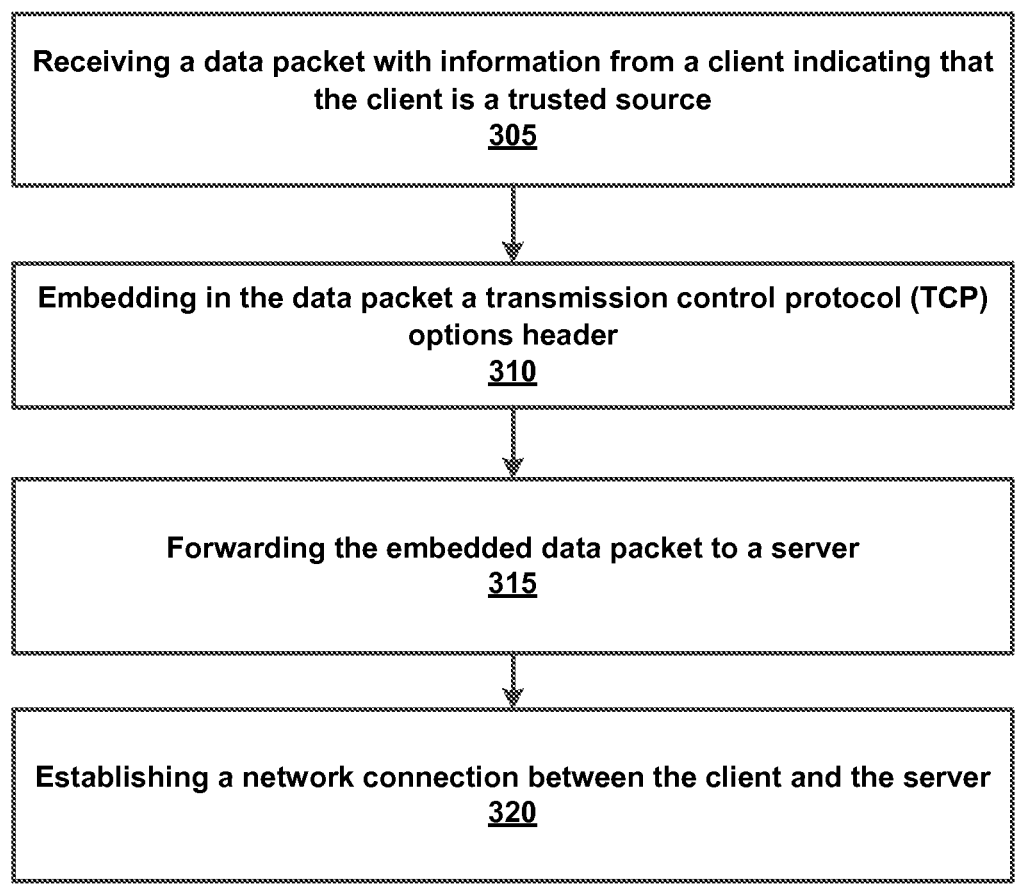
FIG. 3 is a flowchart of an example method for facilitating a secure network by a network device.

FIG. 3 illustrates a method for facilitating a secure network by a network device, such as the ADC described above. According to some embodiments, the method may include the ADC receiving 305 a data packet with information from a client indicating that the client is a trusted source. As mentioned above, the process of the client indicating that it is a trusted source may include a SYN, SYN/ACK, SYN-cookie, and final ACK exchange process as described above. The ADC mediates between the client and server in exchanging these messages so as to prevent malicious network activity by potentially malicious clients. For example, a malicious client may attempt to flood the network with SYN messages to cause a denial of service attack.

In furtherance of this goal, the method also further includes the ADC embedding 310 in the data packet a transmission control protocol (TCP) options header. In some embodiments the TCP options header comprises information including at least a sequence number for a protocol connection. The TCP options header can also include connection parameters, which include parameters that are necessary for efficient data transfer over the secure network. For example, a maximum segment size, a window scale, and a selective acknowledgement message, as well as other parameters that would be known to one of ordinary skill in the art with the present disclosure before them.

The method includes the ADC forwarding 315 the embedded data packet to a server, as well as establishing 320 a network connection between the client and the server.

While the example of FIG. 3 has been described with respect to an ADC, it will be understood that other network device such as routers, switches, firewalls, or other network devices can be also be configured to execute the methods described herein. That is, the technology described herein is not limited to being executed by an ADC.

Figure 4:
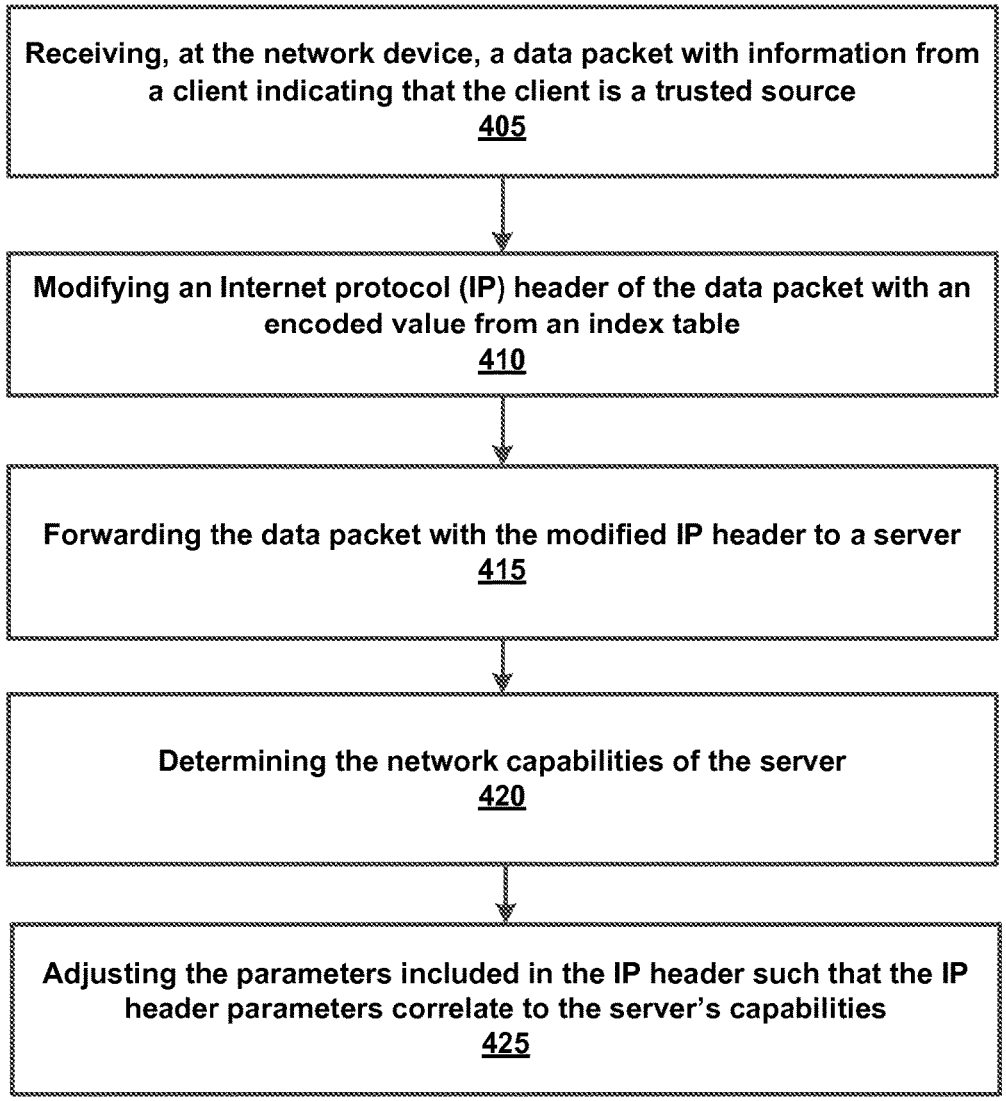
FIG. 4 is a flowchart of another example method for facilitating a secure network by a network device.

FIG. 4 illustrates another method for facilitating a secure network by a network device, such as the ADC described above. In general, this method is configured to use the IP header of a data packet, rather than the TCP options header. In this embodiment, the method includes the ADC receiving 405, at the network device, a data packet with information from a client indicating that the client is a trusted source. Again, this may include a SYN packet or an ACK message received from the client as specified in the examples provided supra.

Next, the method includes the ADC modifying 410 an Internet protocol (IP) header of the data packet with an encoded value from an index table. As with the method above, the encoded value may include a fixed header and options fields. The modification may include encoding parameters such as source information, destination information, sequence numbers, timestamp, as well as other network protocol parameters that would be known to one of ordinary skill in the art.

Once the IP header of the client's packet has been modified, the method includes forwarding 415 the data packet with the modified IP header to a server.

Optionally, the method may include determining 420 the network capabilities of the server and adjusting 425 the parameters included in the IP header such that the IP header parameters correlate to the server's capabilities. For example, if the IP header information includes protocol parameters that cannot be serviced by the server, the ADC can determine the capabilities of the server and adjust the parameters received from the client to ensure that the client and server are able to communicate with one another over the network in a secure manner.

Figure 5:
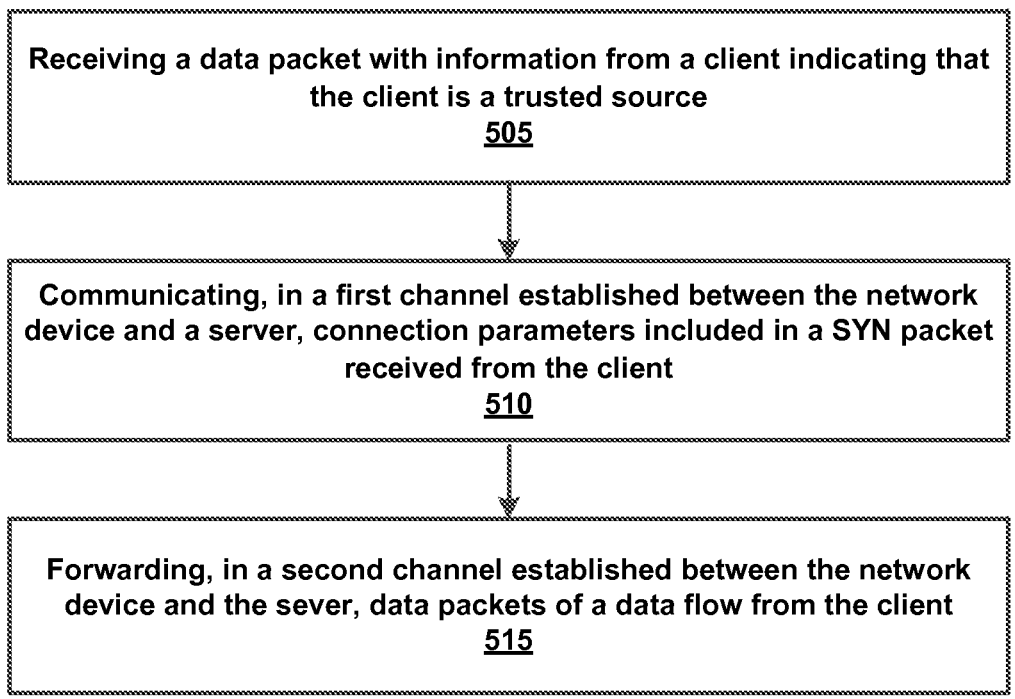
FIG. 5 is a flowchart of an example method for facilitating a secure network by a network device using in-band and out-of-band communication.

FIG. 5 illustrates a method for facilitating a secure network by a network device, where the network device is configured to use in-band and out-of-band channels for communicating with a server. The method may include receiving 505 a data packet with information from a client indicating that the client is a trusted source. Once the data packet is received, the method includes communicating 510, in a first channel established between the network device and a server, connection parameters included in a SYN packet received from the client. It will be understood that the connection parameters comprise, in some embodiments, to parameters included in a SYN packet received from the client. As with the other embodiments, the connection parameters comprise parameters necessary for efficient data transfer over the secure network. In some embodiments, the method includes forwarding 515, in a second channel established between the network device and the server, data packets of a data flow from the client.

As mentioned above, the ADC may also be configured to use IP tunneling as part of the in-band/out-of-band methodology.

Figure 6:
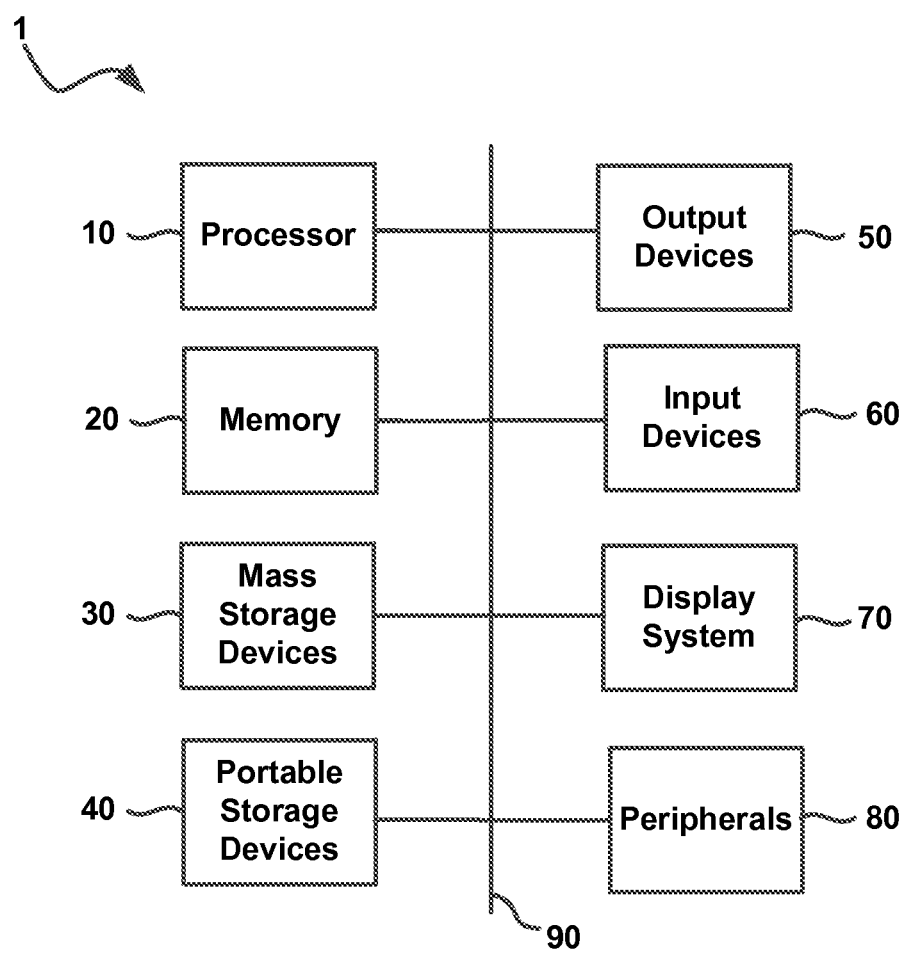
FIG. 6 is a schematic diagram of an example computing device that can be used to implement the present technology.

FIG. 6 illustrates an exemplary computing device 1 that is to implement an embodiment of the present systems and methods. The system 1 of FIG. 6 may be implemented in the contexts of the likes of the server 105 described herein. The computing device 1 of FIG. 6 includes a processor 10 and main memory 20. Main memory 20 stores, in part, instructions and data for execution by processor 10. Main memory 20 may store the executable code when in operation. The system 1 of FIG. 6 further includes a mass storage device 30, portable storage device 40, output devices 50, user input devices 60, a display system 70, and peripherals 80.

The components shown in FIG. 6 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 6. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys, or a scanner for reading bar codes. Additionally, the system 1 as shown in FIG. 6 includes output devices 50. Suitable output devices include speakers, label and receipt printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 6 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, PHP, MySQL, HTML, Java Script, CSS, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for facilitating a secure network by a network device that comprises a processor and a memory for storing executable instructions, wherein the processor executes the instructions to perform the method, comprising:

receiving, by the network device, a data packet with information from a client indicating that the client is a trusted source;

determining, by the network device, network capabilities of a server, the network capabilities including at least network parameters that the server is capable to serve;

correlating, by the network device, the network capabilities of the server with the information present in the data packet, the correlating including:

computing, by the network device, the information present in the data packet to obtain one or more network parameter values associated with the client; and looking up, by the network device, the one or more network parameter values in an index table to select, from a plurality of combinations of network parameters that the server is capable of serving, a combination of network parameters that the server is capable to serve and that corresponds to the one or more network parameter values, the index table storing a plurality of network parameter values corresponding to the plurality of combinations of network parameters that the server is capable to serve; and applying, by the network device, a tunneling protocol to transfer, by the network device, the combination of network parameters to the server, the applying the tunneling protocol including:

creating, by the network device, a modified data packet and placing the data packet and a transmission control protocol (TCP) options header into the modified data packet, the TCP options header comprising information including at least a sequence number for a protocol connection, wherein the information present in the TCP options header includes the combination of network parameters selected from the index table to match the network parameters that the server is capable to serve; and forwarding, by the network device, the modified data packet to the server, wherein the server extracts, from the modified data packet, the data packet and the combination of network parameters and processes the data packet based on the combination of network parameters that the server is capable of serving.

2. The method of claim 1, wherein the data packet received from the client comprises a SYN-cookie received from the network device, wherein the SYN-cookie comprises a sequence number for the network device and an acknowledgement (ACK) that includes a sequence number of the client.

3. The method of claim 2, wherein the network device does not retain information from the data packet until the ACK has been received from the client and a network connection has been established between the server and the client.

4. The method of claim 3, wherein Internet Protocol (IP) connection information is embedded into the ACK, the ACK being forwarded to the server.

5. The method of claim 3, wherein the network device does not retain the TCP options when the network device is operating in a stateless mode.

6. The method of claim 1, wherein the TCP options comprise a maximum segment size, a window scale, and a selective acknowledgement message, wherein the selective acknowledgement message is used for selective retransmission of individual data packets that were not received by the server.

7. The method of claim 1, wherein TCP options are included in the data packet received from the client.

8. The method of claim 1, further comprising authenticating the client by the network device.

9. The method of claim 8, further comprising embedding or stamping any of a server sequence number, a client maximum segment size, a client timestamp, or any other information required for the server to process the embedded data packet, or any combinations thereof.

10. The method of claim 1, wherein the TCP options are embodied in a single message having a predetermined length of bits, wherein the length of bits is separated into segments, each of the segments comprising bits representing one of the TCP options.

11. A method for facilitating secure network by a network device that comprises a processor and a memory for storing executable instructions, wherein the processor executes the instructions to perform the method, comprising:

receiving, at the network device, a data packet with information from a client indicating that the client is a trusted source;

determining, by the network device, network capabilities of a server, the network capabilities including at least network parameters that the server is capable to serve;

correlating, by the network device, the network capabilities of the server with the information present in the data packet, the correlating including:

computing, by the network device, the information present in the data packet to obtain one or more network parameter values associated with the client; and looking up, by the network device, the one or more network parameter values in an index table to select, from a plurality of combinations of network parameters that the server is capable of serving, a combination of network parameters that the server is capable to serve and that corresponds to the one or more network parameter values, the index table storing the plurality of network parameter values corresponding to a plurality of combinations of network parameters that the server is capable to serve; and applying, by the network device, a tunneling protocol to transfer, by the network device, the combination of network parameters to the server, the applying the tunneling protocol including:

creating, by the network device, a modified data packet and placing, into the modified data packet, the data packet and an Internet protocol (IP) header of the modified data packet with an encoded value from the index table, the encoded value from the index table representing the combination of network parameters selected from the index table to match the network parameters that the server is capable to serve; and forwarding, by the network device, the data packet with the modified IP header to the server, wherein the server extracts, from the data packet with the modified IP header, the combination of network parameters and processes the data packet based on the combination of network parameters that the server is capable of serving.

12. The method of claim 11, further comprising:

authenticating the client, wherein the computing the information present in the data packet includes computing parameters included in a SYN packet received from the client; and encoding the combination of network parameters into an IP identification field of the IP header of the data packet.

13. A method for facilitating a secure network by a network device that comprises a processor and a memory for storing executable instructions, wherein the processor executes the instructions to perform the method, comprising:

receiving, by the network device, a data packet with information from a client indicating that the client is a trusted source;

determining, by the network device, network capabilities of a server, the network capabilities including at least network parameters that the server is capable to serve;

correlating, by the network device, the network capabilities of the server with the information present in the data packet, the correlating including:

computing, by the network device, the information present in the data packet to obtain one or more network parameter values associated with the client; and looking up, by the network device, the one or more network parameter values in an index table to select, from a plurality of combinations of network parameters that the server is capable of serving, a combination of network parameters that the server is capable to serve and that corresponds to the one or more network parameter values, the index table storing the plurality of network parameter values corresponding to a plurality of combinations of network parameters that the server is capable to serve;

receiving, by the network device, data packets of a data flow from the client, the data flow being associated with transfer parameters;

communicating, by the network device, in a first channel established between the network device and the server, the transfer parameters associated with the data flow and connection parameters associated with a SYN packet received from the client, the connection parameters comprising the combination of network parameters that the server is capable to serve for data transfer over the secure network, wherein the transfer parameters and the connection parameters are communicated by the network device to the server using a tunneling protocol by:

creating, by the network device, a modified data packet and placing the data packet, the transfer parameters, and the connection parameters into a TCP options header or an IP header of the modified data packet, and forwarding, by the network device, the modified data packet to the server, wherein the server extracts, from the modified data packet, the data packet and the connection parameters and processes the data packet based on the combination of network parameters that the server is capable to serve; and forwarding, by the network device, in a second channel established between the network device and the server, the data packets of the data flow from the client.

14. The method of claim 13, wherein the combination of network parameters comprises at least one of sequence numbers, timestamp, and window size.

15. An application delivery controller, comprising:
a processor; and
a memory for storing executable instructions, the processor being configured to execute the instructions to:
receive a data packet with information from a client indicating that the client is a trusted source;
determine network capabilities of a server, the network capabilities including at least network parameters that the server is capable to serve;
correlate the network capabilities of the server with the information present in the data packet, the correlating including:
computing the information present in the data packet to obtain one or more network parameter values associated with the client; and
looking up the one or more network parameter values in an index table to select, from a plurality of combinations of network parameters that the server is capable of serving, a combination of network parameters that the server is capable to serve and that corresponds to the one or more network parameter values, the index table storing the plurality of network parameter values corresponding to a plurality of combinations of network parameters that the server is capable to serve;

apply a tunneling protocol to transfer the combination of network parameters to the server, the applying the tunneling protocol including either:
(1) creating a first modified data packet and placing the data packet and a transmission control protocol (TCP) options header into the first modified data packet, the TCP options header comprising parameters for a protocol connection, the parameters including the combination of network parameters selected from the index table to match the network parameters that the server is capable to serve, or
(2) creating a second modified data packet and placing, into the second modified data packet, the data packet and an Internet protocol (IP) header of the modified data packet with an encoded value from an index table, the encoded value representing the combination of network parameters selected from the index table to match the network parameters that the server is capable to serve; and forward the first modified data packet or the second modified data packet to the server, wherein the server extracts, from the first modified data packet or the second modified data packet, the data packet and the combination of network parameters and processes the data packet based on the combination of network parameters vu is capable of serving.

16. The application delivery controller of claim 15, wherein the application delivery controller comprises a module that is configured to place an acknowledgement (ACK) packet in the IP header of the data packet.

17. The application delivery controller of claim 16, wherein the tunneling protocol is associated with IP tunneling used by the application delivery controller to transfer the second modified data packet to the server.

18. The application delivery controller of claim 17, wherein the parameters included in the TCP options header are placed into a tunnel header.

19. The application delivery controller of claim 15, wherein the application delivery controller is configured to determine TCP options that the server is capable of providing.

20. The application delivery controller of claim 19, wherein the application delivery controller is configured to adjust the parameters in the TCP options header with the TCP options that the server is capable of providing.

* * * * *